United States Patent
Davydov et al.

(10) Patent No.: US 10,358,025 B2
(45) Date of Patent: Jul. 23, 2019

(54) MULTI-SPEED TRANSMISSION AND METHOD FOR OPERATING THE SAME

(71) Applicant: AVL LIST GMBH, Graz (AT)

(72) Inventors: Vitaly Davydov, Lassnitzhoehe (AT); Peter-Juergen Nissen, Graz (AT); Marco De Bei, Graz (AT)

(73) Assignee: AVL LIST GMBH, Graz (AT)

( * ) Notice: Subject to any disclaimer, the term of this patent is extended or adjusted under 35 U.S.C. 154(b) by 91 days.

(21) Appl. No.: 15/533,254

(22) PCT Filed: Dec. 9, 2015

(86) PCT No.: PCT/EP2015/079090
§ 371 (c)(1),
(2) Date: Jun. 5, 2017

(87) PCT Pub. No.: WO2016/091934
PCT Pub. Date: Jun. 16, 2016

(65) Prior Publication Data
US 2017/0361696 A1    Dec. 21, 2017

(30) Foreign Application Priority Data
Dec. 9, 2014 (EP) ..................... 14196899

(51) Int. Cl.
*B60K 6/36* (2007.10)
*B60K 6/365* (2007.10)
(Continued)

(52) U.S. Cl.
CPC ............. *B60K 6/365* (2013.01); *B60K 6/36* (2013.01); *B60K 6/387* (2013.01); *B60K 6/48* (2013.01);
(Continued)

(58) Field of Classification Search
CPC .......... B60K 6/365; B60K 6/48; B60K 6/547; B60K 6/387; B60T 1/005; B60W 10/08;
(Continued)

(56) References Cited

U.S. PATENT DOCUMENTS

7,575,529 B2    8/2009  Holmes
8,771,139 B2    7/2014  Ideshio et al.
(Continued)

*Primary Examiner* — Mark J Beauchaine
(74) *Attorney, Agent, or Firm* — Dykema Gossett PLLC (57) ABSTRACT

The invention relates to a multi-speed transmission, comprising a power split device, an input shaft of the transmission being connected or connectable to prime mover, an output shaft, two shiftable sub-transmissions, each providing a plurality of different gear ratios, and at least one rotating electric machine, connected to said power split device, wherein the two sub-transmissions can be connected alternatively to the output shaft, and a control system, connecting said electric machine with an electric battery and auxiliary electrical consumers. The electric machine is connected to the power split device in a way to reduce torque value down to zero on either an input shaft of the first sub-transmission or on an input shaft of the second sub-transmission by applying different shaft torque levels, and the internal heat generation capacity of the electric machine exceeds the power capacity of the control system power line.

40 Claims, 7 Drawing Sheets

(51) Int. Cl.
<table>
<tr><td>B60K 6/48</td><td>(2007.10)</td></tr>
<tr><td>B60W 10/06</td><td>(2006.01)</td></tr>
<tr><td>B60W 10/08</td><td>(2006.01)</td></tr>
<tr><td>B60W 10/113</td><td>(2012.01)</td></tr>
<tr><td>B60W 20/00</td><td>(2016.01)</td></tr>
<tr><td>B60W 30/18</td><td>(2012.01)</td></tr>
<tr><td>B60W 30/19</td><td>(2012.01)</td></tr>
<tr><td>B60W 20/14</td><td>(2016.01)</td></tr>
<tr><td>B60K 6/387</td><td>(2007.10)</td></tr>
<tr><td>B60K 6/547</td><td>(2007.10)</td></tr>
<tr><td>B60T 1/00</td><td>(2006.01)</td></tr>
<tr><td>B60W 20/10</td><td>(2016.01)</td></tr>
<tr><td>F16H 37/08</td><td>(2006.01)</td></tr>
</table>

(52) U.S. Cl.
CPC .............. *B60K 6/547* (2013.01); *B60T 1/005* (2013.01); *B60W 10/06* (2013.01); *B60W 10/08* (2013.01); *B60W 10/113* (2013.01); *B60W 20/00* (2013.01); *B60W 20/10* (2013.01); *B60W 20/14* (2016.01); *B60W 30/18109* (2013.01); *B60W 30/18127* (2013.01); *B60W 30/19* (2013.01); *F16H 37/0833* (2013.01); *B60K 2006/4816* (2013.01); *B60Y 2200/92* (2013.01); *B60Y 2400/421* (2013.01); *B60Y 2400/732* (2013.01); *Y02E 20/14* (2013.01); *Y02T 10/6221* (2013.01); *Y02T 10/6256* (2013.01); *Y02T 10/6286* (2013.01); *Y10S 903/911* (2013.01); *Y10S 903/914* (2013.01); *Y10S 903/919* (2013.01)

(58) Field of Classification Search
CPC .............. B60W 20/10; F16H 37/0833; B60Y 2400/421; B60Y 2400/732; B60Y 2200/921; Y10S 903/911; Y10S 903/914; Y10S 903/919
See application file for complete search history.

(56) References Cited

U.S. PATENT DOCUMENTS

<table>
<tr><td>2002/0147530 A1</td><td>10/2002</td><td>Tamagawa et al.</td></tr>
<tr><td>2010/0190604 A1*</td><td>7/2010</td><td>Lawson, Jr. ............ B60L 50/16<br>477/70</td></tr>
<tr><td>2011/0111910 A1</td><td>5/2011</td><td>Ideshio et al.</td></tr>
<tr><td>2013/0172140 A1*</td><td>7/2013</td><td>Potter ...................... B60K 6/54<br>475/5</td></tr>
<tr><td>2013/0196805 A1*</td><td>8/2013</td><td>Phillips .................. B60K 6/445<br>475/5</td></tr>
</table>

* cited by examiner

MULTI-SPEED TRANSMISSION AND METHOD FOR OPERATING THE SAME

The invention relates to a multi-speed transmission, especially for a vehicle, comprising a power split device, an input shaft of the transmission being connected or connectable to a prime mover, an output shaft, two shiftable sub-transmissions, each providing a plurality of different gear ratios, and at least one rotating electric machine, connected or being connectable to said power split device, wherein the two sub-transmissions can be connected alternatively to the output shaft, and a control system connecting said electric machine with an electric battery and auxiliary electrical consumers. Further the invention relates to a method for operating such a multi-speed transmission.

The document U.S. Pat. No. 8,771,139 B2 describes a power transmission unit with an engine and a plurality of speed change gear pairs, each of which has a different gear ratio, and to which a power outputted from the engine is transmitted. The power transmission unit comprises a differential mechanism, which has three rotary elements performing a differential action, and in which a first rotary element is connected with the engine. An electric motor is connected with a secondary rotary element of the three rotary elements. The plurality of speed change gear pairs include a first gear pair connected with the first rotary element and the output member, and a second gear pair connected with a third rotary element of the three rotary elements and the output member.

The U.S. Pat. No. 7,575,529 B2 describes an electrically variable transmission, wherein the transmission provides electrically variable power flow along dual power paths and provides an electrically variable reverse operating mode. The transmission includes a compound differential gear set having at least four gear elements operatively interconnected with one another. A transmission input member and the single motor/generator selectively provide power to a transmission output member via the differential gear set. The transmission includes a plurality of intermeshing gears, including a reverse gear and gears connected for rotation with the output member, for operatively connecting the differential gear set with the output member. Torque-transmitting mechanisms are selectively engageable to provide power flow between the input member and the output member in multiple operating modes, including a parallel hybrid electrically variable operating mode utilizing the reversing gear.

Electric motor/generators of known hybrid transmissions are constituted for four quadrant operation with high positive and negative shaft power, which is comparable to the engine power. The motor/generators have to be designed large-sized, the control of the motor/generators is complex and expensive.

It is the object of the present invention to avoid these disadvantages and to provide a compact and low priced multi-speed transmission. It is a further object of the invention to enable a reduction of the torque decrease during gear shifting.

According to the present invention this is achieved in that the electric machine is connected to the power split device and controlled by the control systems in a way that it allows to reduce torque value down to zero on either an input shaft of the first sub-transmission or on an input shaft of the second sub-transmission by applying different shaft torque levels and the internal heat generation capacity of the electric machine exceeds the power capacity of the power line in said control system, wherein the reduced torque down to zero on the input shaft of either the first sub-transmission or the second sub-transmission results from an equilibrium of torques at least from the electric machine and from the prime mover.

In all embodiments of the invention, the electric machine is connected to the power split device in a way that any applied torque by it in one direction results to torque reduction on the input shaft of the first sub-transmission, and to torque increase on the input shaft of the second sub-transmission. If the applied torque by electric machine is reversed, this results to torque reduction on the input shaft of the second sub-transmission, and to torque increase on the input shaft of the first sub-transmission. For any given torque value from the prime mover, there is one certain torque on the electric machine, when there is no torque on the input shaft of the first sub-transmission, and another certain torque on the electric machine, when there is no torque on the input shaft of the second sub-transmission.

In comparison to prior art embodiments the power electronics and the battery can be designed with reduced capacity. The electric machine can be designed smaller. This enables lower cost, weight and package. In contrast to conventional AMTs (Automated Manual Transmission) design can be carried out without any friction clutches and synchronizers.

The transmission according to the present invention has torque fill capacity. This means that torque reduction during shift operations can be compensated at least partly. Thereby the electric machine is controlled by the control system in a way that it allows to reduce torque value down to zero on either input shaft of the first sub-transmission, or on the input shaft of the second sub-transmission, by applying positive or negative power. The positive power is taken from the battery. A fraction of negative power, which does not exceed instant power consumption from the battery with auxiliary electrical consumers, is delivered to the battery and to auxiliary electrical consumers. A residual fraction of negative power is dissipated in the electric machine as heat.

The electric machine provides torque reaction and supplies the electric power at the same time, converting a fraction of the shifting losses to electric energy. The power capacity of the control system is several times smaller than for conventional hybrid transmissions with torque-filled shifts.

The fraction of heat dissipation is at least 50%.

In well-known hybrid transmissions the efficiency of the electric drives in hybrid powertrain is above 85% to 90%, wherein 10% to 15% of the energy is dissipated in the electric machine and the control system. For the invention, preferably 95% to 99% should be dissipated, in order to avoid expensive electronics and large battery. In practice, the fraction of heat dissipation may be in the range between 50% and 99%.

According to a preferred embodiment of the invention the connections of the power split device, and the combination of gear ratios of the power split device and the sub-transmissions allow to reduce torque value down to zero on either the input shaft of the first sub-transmission or on the input shaft of the second sub-transmission by applying only negative shaft power to the electric machine, while the transmission transfers the power from the input shaft to the output shaft. Lowest cost, weight and package can be realized, when the control system of the electric machine and/or the electric machine is limited solely to negative shaft power operation of the electric machine, so the electric machine can be operated solely with negative shaft power. Designing the electric machine with positive power operations can be neglected. This design would enable a smaller electric machine. Further a reduced capacity of the power electronics and the battery would enable lower cost, weight and package as well as a very compact and small layout of the electric machine, saving costs and weight.

However, there is an opportunity to select gear ratios in such a way, that in some modes a small positive power is required from the electric machine for torque split, i.e. when the rotor speed is reversed. This small power is below peak capacity of the control system.

Therefore the power capacity of the electric machine control system should be limited just to provide engine starter function, power supply function to charge conventional low-voltage battery and to synchronize shaft speeds in the sub-transmission during gear changing in the sub-transmission when it does not transmit the power flow. For typical applications the power capacity of the electric machine control system should be from 1% to 5% of the engine rated power.

During torque-filled gearshifts a relatively high level of negative power should be applied to the shaft of the electric machine, up to 50% of the engine power. To avoid overload of the control system, a major fraction of that negative power should be dissipated in the inductor of the electric machine as heat power. In a preferred embodiment the armature of the electric machine is a stator with coils, which are connected to AC inverter, and the inductor is a rotor with a squirrel cage. In another possible embodiment the inductor is a stator with squirrel cage, and the armature is a rotor with coils, which are connected to AC inverter via sliding brushes and contact rings.

The required heat generation capacity of the electric machine can be provided by heat capacity of the rotor and natural air cooling, forced air cooling of the rotor or forced liquid cooling of the rotor.

In engine start, power supply and shaft synchronizing modes the electric machine operates like state-of-the-art induction inverter-fed machines. During torque-filled gearshifts it operates in generating mode with higher slip ratio than conventional electric machines. A large fraction of shaft power is dissipated in the squirrel cage. For light-duty applications heat capacity of the squirrel cage and the surrounding core can be used to absorb heat energy during torque-filled shifts. For heavy-duty applications forced cooling of the inductor may be implemented (e.g. liquid cooling)

The inventive transmission and method can be used for gear disengagement, shaft speed synchronization and gear engagement in that sub-transmission which is unloaded by the torque reduction, wherein friction clutches can be avoided.

Further it can be used for launching the vehicle with the transmission. Precise launch control may be provided without using of any master clutch or torque converter.

Further it can be used for braking the vehicle with the transmission. This function may replace conventional transmission retarder (e.g. hydrodynamic or eddy-current) in heavy-duty applications. Forced liquid cooling of the rotor is required for this function.

The multi-speed transmission according to the present invention can also be used for starting the engine up, in the way that power is taken from the battery and delivered to a crankshaft for cranking. The power capacity of the power line in the control system need not exceed the power needed for engine cranking with electric machine.

Synchronizers can be eliminated when the electric machine is used for changing the speed of the input shaft of the one of the sub-transmissions, when this sub-transmission does not transmit the power flow, wherein this speed changing is done independently on the engine speed.

In a low cost and simplest design embodiment of the power split device there is provided that the power split device is a three-link planetary gear set acting as a summing differential, with a first link, a second link and a third link. Such design may be used in the transmission with partial torque fill. In a first layout of this embodiment it is provided that the input shaft of the transmission is engageable to the first link, the input shaft of the first sub-transmission is engageable to the first link, the input shaft of the second sub-transmission is connected to the third link, and the electric machine is connected to the second link of said three-link planetary gear set, wherein preferably the speed ratio between the second link and the third link is negative for stopped first link. In a second layout of this low cost embodiment it is provided that the input shaft of the transmission is engageable to the third link, the input shaft of the first sub-transmission is connected to the first link, the input shaft of the second sub-transmission is engageable to the third link, and the electric machine is connected to the second link of said gear set, wherein preferably the speed ratio between the second link and the third link is negative for stopped first. These low cost embodiments can be designed without any friction clutches and synchronizers, wherein full torque fill capacity is provided.

When the electric machine is locked, speed reduction is provided from the transmission input shaft to the input shaft of the first sub-transmission, increasing overall gear ratio of the transmission.

In simple and low cost embodiments with a reduced number of components the input shaft of the transmission and/or the first sub-transmission are constantly connected to the first link. Alternatively, especially for hybrid applications, the input shaft of the transmission may be engageable to the first link via an input clutch. For high-performance applications with demand for higher rate of torque fill the input shaft of the first sub-transmission can be engaged to the first link via an intermediate clutch, for example a friction clutch.

Further for low cost applications the transmission additionally may include a lock-up clutch for locking the power split, for example arranged between the first and the third link. With this optional lock-up clutch additional gears may be provided by double use of the second sub-transmission.

In an advanced embodiment of the present invention it is provided that the input shaft of the transmission is engageable to the first link via a first clutch and to the third link via a third clutch, the input shaft of the first sub-transmission is engageable to the first link via a second clutch and to the third link via a forth clutch, the input shaft of the second sub-transmission is connected to the input shaft, and the electric machine is connected to the second link of said gear set, wherein preferably the speed ratio between the second link and the third link is negative for stopped first link. Therefore with selective connection of the combustion engine and the first sub-transmission more gears are available or torque fill capacity is improved. At least one of said first, second, third and fourth clutches may be embodied as a dog clutch.

In each of said embodiment described above the first link may be a planet carrier, the second link a sun gear and the third link a ring gear. This connection gives the internal ratio of −1.4 to −4, providing possible transmission gear step of 1.25 to 1.7.

In a further embodiments of the invention it is provided that the power split device is a five-link planetary gear set acting as a summing differential, with a first link, a second link, a third link, a fourth link and a fifth link, wherein preferably the input shaft of the transmission is engageable to the first link, the input shaft of the first sub-transmission is connected to the second link, the input shaft of the second sub-transmission is connected to the third link, and a first electric machine is engageable to the forth link of said gear set. In an advantageous embodiment of the present invention it is provided that the speed ratio between the second link and the third link is negative for stopped first link, the speed ratio between the forth link and the fifth link is negative for stopped first link, the speed ratio of the forth link to the second link is more than one for stopped first link, and the speed ratio of fifth link to the third link is more than one for stopped first link. The five-link power split device either provides twice more gears or improves torque fill capability with the same number of gearwheels and shifting elements in sub-transmissions.

More preferably the transmission additionally comprises a second electric machine, which is connected to the fifth link, and the first electric machine is constantly connected to the forth link. In order to reduce costs unified electric machines and power electronics can be used. Optionally eCVT (electronic continuous variable transmission)—capability at small loads and speeds can be used. Alternatively the transmission additionally comprises an electric brake, which is connected to the fifth link, and the first electric machine is constantly connected to the forth link. For the electric brake a simple DC converter can be used instead of an AC inverter. One electric machine—the first electric machine—is enough to provide starter and alternator functions. Preferably the electric brake is embodied as an eddy current brake. But also other electric brakes may be used.

Alternatively to an electric brake the transmission may comprise a friction brake, which is connected to the fifth link, and wherein the first electric machine is constantly connected to the forth link.

The first electric machine may be engageable to the fourth link via a first selection clutch and to the fifth link via a second selection clutch. In this way the fourth and/or fifth links can be connected to a single electric machine, i.e., the first electric machine. Using a single electric machine has the advantage that costs and weights can be reduced. In a very simple embodiment the first and/or second selection clutches may be designed as dog clutches. Further the transmission additionally may comprise a controllable brake, for example a simple dog brake, connecting the fifth link to a transmission housing. The brake may provide one or two additional gears.

In a further embodiment of five-link power split device it is provided that the five-link planetary gear set is a modified Ravigneaux gear set, wherein preferably the first link is a planet carrier, the second and the third links are ring gears, the forth and the fifth links are sun gears, the second and forth links are meshed via first row of planets, the third and fifth links are meshed with second row of planets and said first and second rows of planets are intermeshed. At least one of the rows of planets may comprise double mesh planets. Alternatively the five-link planetary gear set may comprise the row of planets with quad mesh, wherein the four meshes are meshed with the first, second, third and fourth links correspondingly, and wherein the fifth link is connected to planet carrier. The first, second, third and fourth links may be sun gears or ring gears.

In each embodiment of the five-link power split devices the input shaft may be connected to the first link constantly. A fixed connection between input shaft and first link is suitable for low-cost applications with a reduced number of components. Alternatively—especially for hybrid applications, enabling an E-Drive mode—the input shaft may be engageable to the first link via an input clutch.

In connection with the present invention the transmission additionally may include a plurality of control elements, which interconnect the links of said sub-transmissions to transfer the power flow, wherein at least one of the control elements can be configured as a dog clutch. At least one of said sub-transmissions may be designed as a two-shaft gearbox with parallel input and output shafts or as a three-shaft gearbox with parallel input and two output shafts, both output shafts constantly meshing with a final gear. Alternatively at least one of said sub-transmissions may be a three-shaft gearbox with coaxial input and output shafts, wherein preferably one of the gear is a direct gear. More alternatively at least one of said sub-transmissions may be a planetary gearbox, with preferably one of the gear being a direct gear. A direct gear has the advantage of best efficiency.

In each embodiment the reduced torque value down to zero on the input shaft of either one sub-transmission results from an equilibrium of torques from the at least one electric machine and from the prime mover, and optionally from a brake and the second machine.

The invention is explained below in closer detail by reference to the drawings, wherein.

Figures 1, 2, 3, 4, 5, 6:
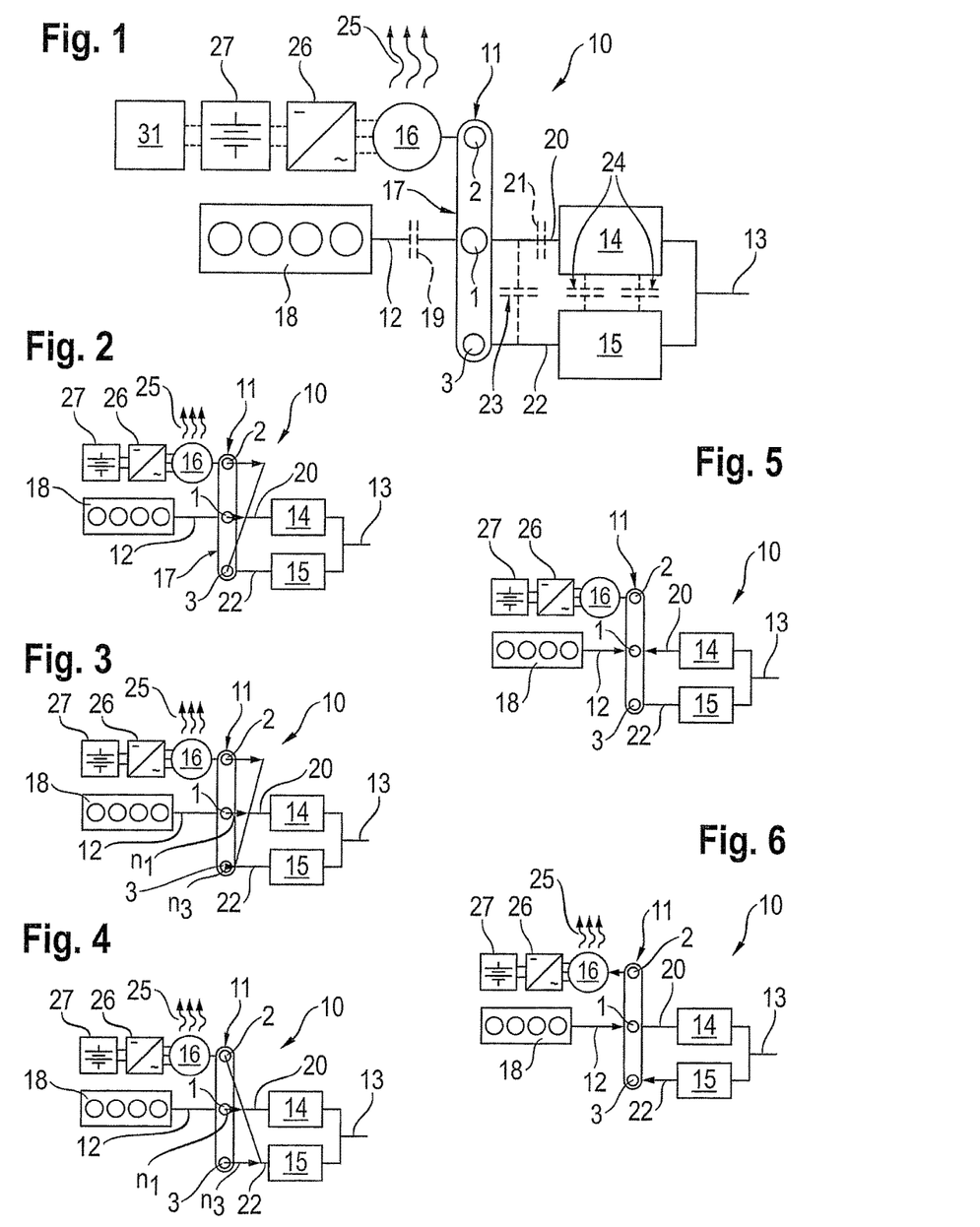
FIG. 1 is a schematic illustration of a multi speed transmission with a three link power split device in accordance with a first embodiment of invention.
FIG. 2 schematically shows this transmission in a first operating state.
FIG. 3 schematically shows this transmission in a second operating state.
FIG. 4 schematically shows this transmission in a third operating state.
FIG. 5 schematically shows this transmission in a fourth operating state.
FIG. 6 schematically shows this transmission in a fifth operating state.
Figures 7, 8, 9, 10, 11, 12:
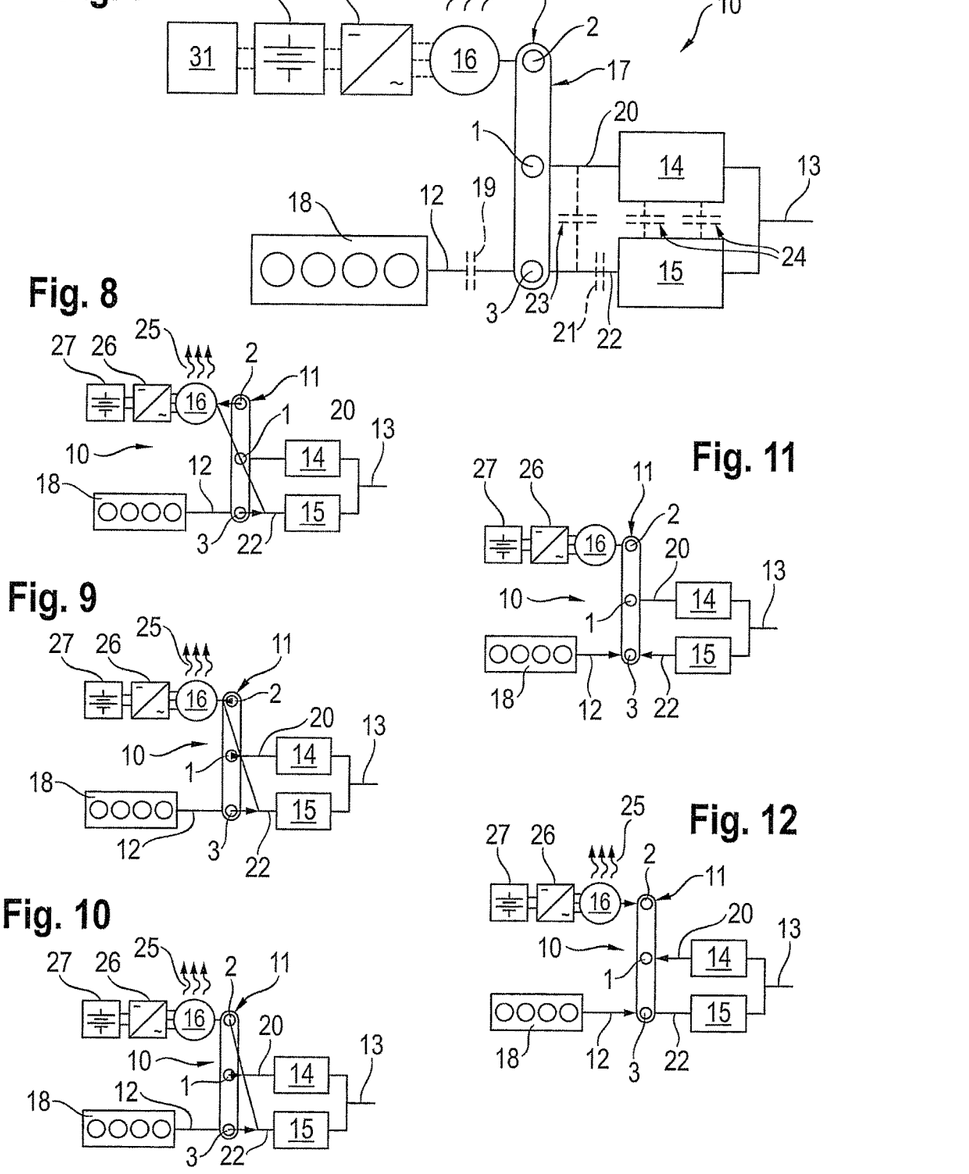
FIG. 7 is a schematic illustration of a multi speed transmission with a three link power split device in accordance with a second embodiment of the invention.
FIG. 8 schematically shows this transmission in a first operating state.
FIG. 9 schematically shows this transmission in a second operating state.
FIG. 10 schematically shows this transmission in a third operating state.
FIG. 11 schematically shows this transmission in a fourth operating state.
FIG. 12 schematically shows this transmission in a fifth operating state.
Figure 13:
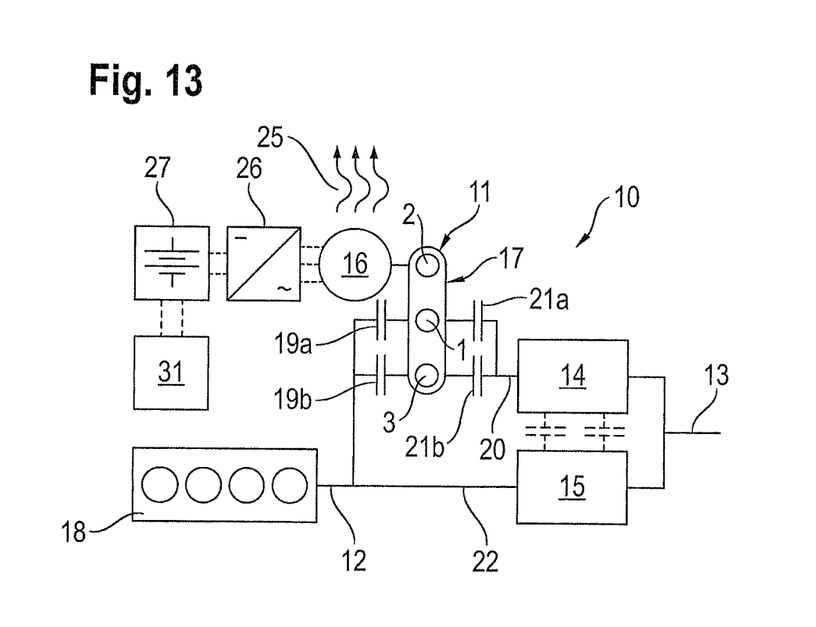
FIG. 13 is a schematic illustration of a multi speed transmission with a five link power split device in accordance with a third embodiment of the invention.

FIGS. 1 to 13 each show multi speed transmissions 10 for a vehicle comprising a power split device 11, an input shaft 12, an output shaft 13, a first shiftable sub-transmission 14 and a second shiftable sub-transmission 15, wherein each of the sub transmissions 14, 15 provides a plurality of different gear ratios. The transmission 10 further comprises a rotating electric machine 16, connected to the power split device 11. The electric machine 16, e.g., is a multi-phase induction machine with squirrel cage inductor. According to a brushless variant the inductor is a movable rotor, the armature is a fixed stator, and the windings of the armature are connected to the multi-phase bi-directional AC/DC power inverter via fixed electrical connection. Better cooling conditions are available with an immovable inductor being designed as a fixed stator; the armature is a movable rotor, and the windings of the armature are electrically connected to the multi-phase bi-directional AC/DC power inverter via sliding contact of brushes and rings. The inductor is capable of dissipating full mechanical brake power. The inductor may comprise means for forced cooling, e.g. at least one cooling passage for liquid cooling. The two sub-transmissions 14, 15 can be connected alternatively to the output shaft 13. The electric machine 16 is electrically connected to a control system 26 and a battery 27, e.g., a low-voltage battery. The control system 26 of the electric machine 16 may comprise a multi-phase bi-directional AC/DC power inverter. The braking power capacity of the electric machine 16 exceeds the power capacity of the multi-phase bi-directional AC/DC converter. The internal heat dissipation power of the electric machine 16 is higher than the electric power flow through the control system 26 of the electric machine 16. Each of the FIGS. 1, 7 and 13 shows embodiments with power split devices 11 each of them being configured as a three-link planetary gear sets 17 with first links 1, second links 2 and third links 3. The input shaft 12 of the transmission 10 is connected to a prime mover 18, e.g. an internal combustion engine. In the first embodiment shown in FIG. 1 to 6 the input shaft 12 of the transmission 10 is engaged to the first link 1 or engageable to the first link 1 of the planetary gear set 17 via a switchable input clutch 19. In the second embodiment shown in FIG. 7 to 12 the input shaft 12 of the transmission 10 is engaged to the third link 3 or engageable to the third link 3 of the planetary gear set 17 via a switchable first clutch 19. The input shaft 20 of the first sub-transmission 14 is engaged to the first link 1 or engageable to the first link 1 via a switchable clutch 21. The input shaft 22 of the second sub-transmission 15 is connected to the third link 3. The electric machine 16 is connected to the second link 2 of the planetary gear set 17, wherein the speed ratio between the second link 2 and the third link 3 is negative for stopped first link 1.

For example, the first link 1 may be a planet carrier, the second link 2 a sun gear and the third link 3 a ring gear. This connection enables an internal ratio of −1.4 to −4, providing possible transmission gear steps of 1.25 to 1.7.

Optionally an input clutch 19 can be arranged between the prime mover 18 and the planetary gear 17. The input shaft 12 of the transmission 10 is engageable to the first link 1 (FIGS. 1 to 6) or the third link 3 (FIGS. 7 to 12), respectively, via the input clutch 19. This connection, e.g. for hybrid applications, enables electric drive modes of the vehicle. Alternatively, for low-cost applications with a reduced number of components, the input shaft 12 of the transmission 10 may be constantly connected to the first link 1.

Further optionally an intermediate clutch 21 can be arranged between the first link 1 and the input shaft 20 of the first sub-transmission 14 (FIGS. 1 to 6) or between the third link 3 and the input shaft 20 of the second sub-transmission 15 (FIGS. 7 to 12), respectively. This enables high performance and a higher rate of torque fill. For low cost applications with reduced number of components alternatively the first sub-transmission 14 or second sub-transmission 15, respectively, may be constantly connected to the first link 1.

With an optional lockup clutch 23 between the first and the third links 1, 3 of the planetary gear set 17 additional gears may be provided by double use of the second sub-transmission. Further optional interconnections 24 may be arranged between first and second sub-transmissions 14, 15.

The FIGS. 8 to 10 show variations in operation of the planetary gear set 17 of the second embodiment of the transmission 10 shown in FIG. 7. FIG. 8 shows a moving-off situation of the vehicle using the first sub-transmission 14, wherein the prime mover 18 drives the input shaft 12. The electric machine 16 is rotating with negative torque while braking power 25 of the electric machine 16 is dissipated. FIG. 9 shows a similar situation with increasing negative torque of the rotating electric machine 16. The speed $n_3$ of the third link 3 is much larger than the speed $n_1$ of the first link 1: $n_3 \gg n_1$. FIG. 10 shows an operating situation with stopped first electric machine 16, and with $n_3 > n_1$.

FIGS. 11 and 12 show the torque distribution control by the first electric machine 16. In FIG. 11 controlled by the first electric machine 16 zero torque is applied to the first sub-transmission 14. So shifting is possible in the first sub-transmission 14. In FIG. 12 the electric machine 16 is operated with negative torque in a way that zero torque is applied to the second sub-transmission 15. So shifting is possible in the second sub-transmission 15. Torque fill is provided by the first sub-transmission 14. The electric machine 16 provides torque reaction and dissipates braking power 25.

FIG. 13 shows a third embodiment of the transmission 10, wherein the input shaft 12 of the transmission 10 is engageable to the first link 1 via a first input clutch 19a and to the third link 3 via a second input clutch 19b. The input shaft 20 of the first sub-transmission 14 is engageable to the first link 1 via a first intermediate clutch 21a and to the third link 3 via a second intermediate clutch 21b. The input shaft 22 of the second sub-transmission 15 is connected to the input shaft 12 of the transmission 10. The clutches 19a, 19b, 21a, 21b can be configured as dog clutches. The speed ration between second link 2 and third link 3 is negative for stopped first link 1.

The third embodiment has the advantage that with selective connection of the combustion engine 18 and the first sub-transmissions 14 more gears are available or torque fill capacity is improved. As described above, for example the first link 1 may be a planet carrier, the second link 2 a sun gear and the third link 3 a ring gear. This connection enables an internal ratio of −1.4 to −4, providing possible transmission gear steps of 1.25 to 1.7.

FIGS. 14 to 17 each show multi speed transmissions 110 for a vehicle comprising a power split device 111, an input shaft 112, an output shaft 113, a first shiftable sub-transmission 114 and a second shiftable sub transmission 115, wherein each of the sub transmissions 114, 115 provides a plurality of different gear ratios. The transmission 110 further comprises a rotating first electric machine 116, connected to the power split device 111. The two sub-transmissions 114, 115 can be connected alternatively to the output shaft 113. The first electric machine 116 is electrically connected to a control system 126 and a battery 127. Electric machine 116, control system 126 and battery 127 are similar to the aforesaid embodiments. Each of the FIGS. 14 to 17 shows embodiments with power split devices 111 each of them being configured as a five-link planetary gear sets 117 with first links 105, second links 102, third links 103, fort links 104 and fifth links 105. The input shaft 112 of the transmission 110 is connected to a prime mover 118, e.g. an internal combustion engine. The input shaft 112 of the transmission 110 is engaged to the first link 101 or engageable to the first link 101 of the five-link planetary gear set 117 via a switchable input clutch 119. The input shaft 120 of the first sub-transmission 114 is engaged to the second link 102. The input shaft 122 of the second sub-transmission 115 is connected to the third link 103. The first electric machine 116 is connected to the forth link 104 of the five link planetary gear set 117, wherein the speed ratio between the second link 102 and the third link 103 is negative for stopped first link 101, the speed ratio between the forth link 104 and the fifth link 105 is negative for stopped first link 101, the speed ratio of forth link 104 to second link 102 is more than one for stopped first link 101 and the speed ratio of fifth link 105 to third link 103 is more than one for stopped first link 101.

With an optional lockup clutch 123 between the first link 101 and the second link 102 of the planetary gear set 117 the first link 101 and the second link 102 can be locked.

Figure 14:
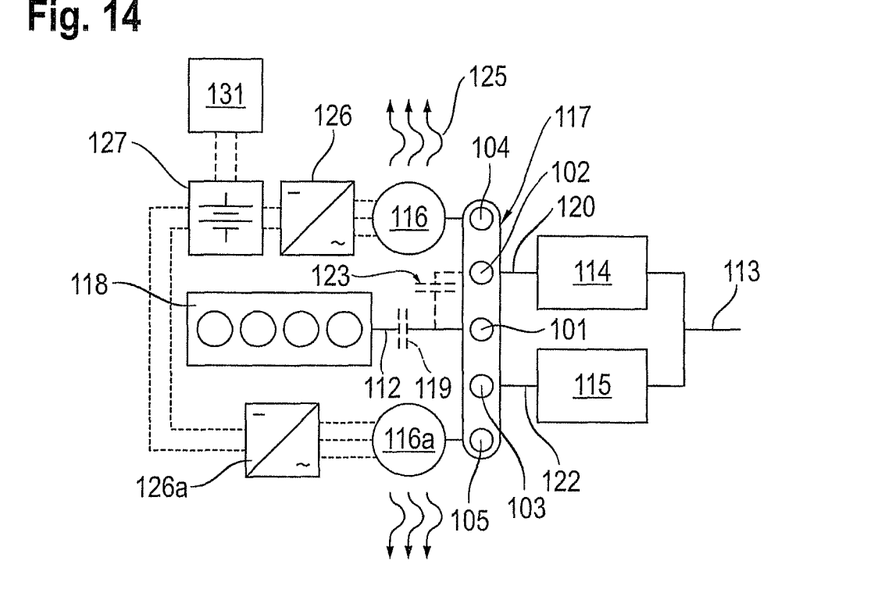
FIG. 14 is a schematic illustration of a multi speed transmission with a five link power split device in accordance with a forth embodiment of the invention.

In the fourth embodiment of the transmission 110 shown in FIG. 14 the transmission 110 additionally comprises a second machine 116a, which is connected to the fifth link 105 of the five-link planetary gear set 117. The second electric machine 116a is electrically connected to a second control system 126a and the battery 127. Power electronics and electric machines 116, 116a may be unified. The two electric machines 116, 116a enable eCVT (electric continuously variable transmission)-capability at small loads and speeds.

Figure 15:
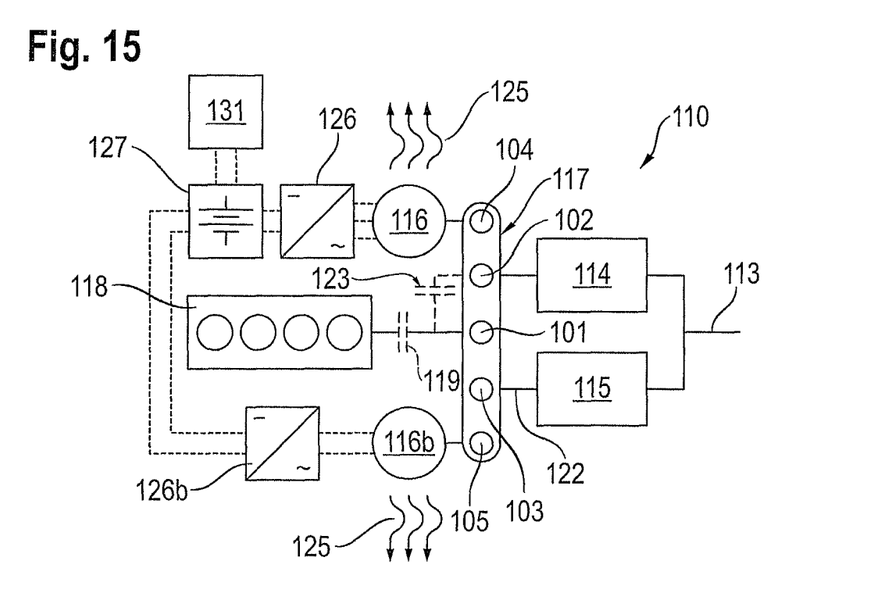
FIG. 15 is a schematic illustration of a multi speed transmission with a five link power split device in accordance with a fifth embodiment of the invention.

FIG. 15 shows an fifth embodiment of the transmission 110 similar to FIG. 14, wherein the second electric machine 116a is replaced by an electric brake 116b, which is connected to the fifth link 105 of the five-link planetary gear set 117. The electric brake 116b is electrically connected to a second control system 126b, e.g., a DC converter, and the battery 127. A DC-converter of an electric brake is much simpler than an AC-inverter of an electric machine. For example the electric brake 116b is an eddy current brake. Of course other types of electric brakes are possible, too.

Figure 16:
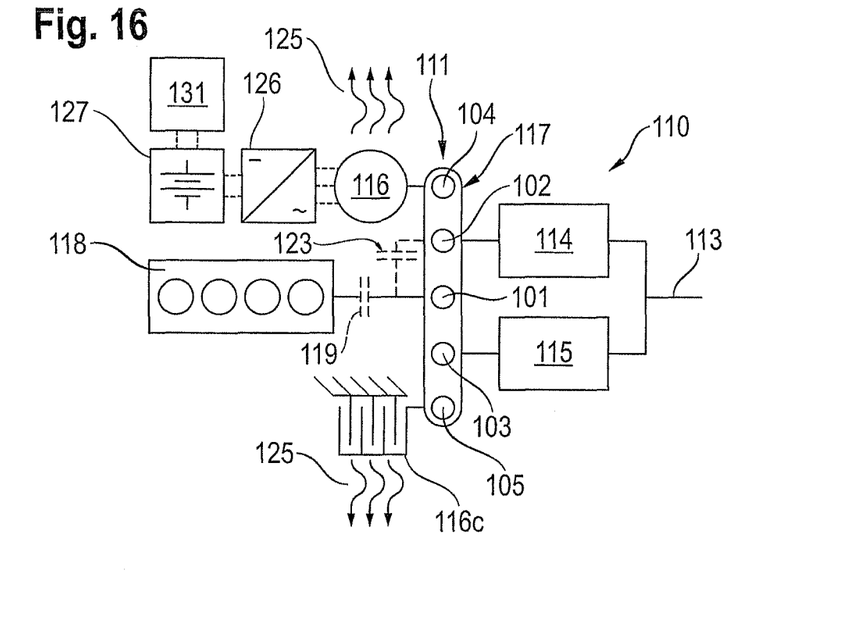
FIG. 16 is a schematic illustration of a multi speed transmission with a five link power split device in accordance with a sixth embodiment of the invention.

Alternatively to a second machine 116a or an electric brake 116b, the transmission 110 additionally may comprise a friction brake 116c, which is connected to the fifth link 105 of the five-link planetary gear set 117. A sixth embodiment including such a friction brake 116c is shown in FIG. 16. Friction brakes save costs and package. The first electric machine 116a is sufficient to provide starter and alternator functions.

Figure 17:
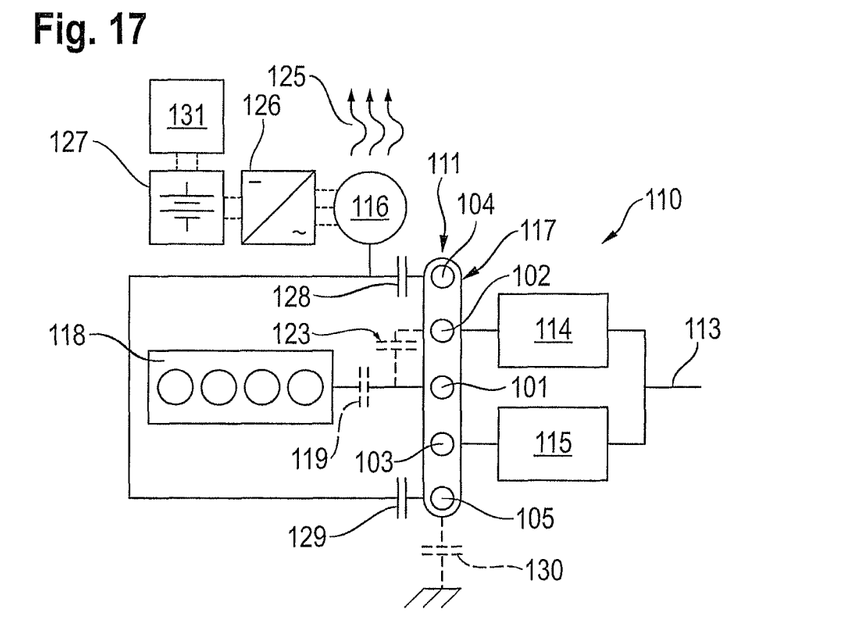
FIG. 17 is a schematic illustration of a multi speed transmission with a five link power split device in accordance with a seventh embodiment of the invention.

FIG. 17 shows a seventh embodiment of a transmission 110 with a five link planetary gear set 117 similar to FIG. 14 to 16, wherein the electric machine 116 is engageable to the forth link 104 of the planetary gear set 117 via a first selection clutch 128 and to the fifth link 105 of the planetary gear set 117 via a second selection clutch 129. The single electric machine 116 reduces costs and weight. As indicated in FIG. 17 by broken lines, the transmission 110 additionally may comprise a controllable brake 130 in order to provide one or two additional gears. According to a variant with very simple design the first selection clutch 128, the second selection clutch 129 and/or the brake 130 are configured as dog clutches.

The FIGS. 18 to 24 show variations in operation of a five-link planetary gear set 117 of the embodiment shown in FIG. 14. But FIGS. 18 to 24 may also apply to embodiments shown in FIGS. 15 to 17 with electric brakes 116b or friction brakes 116c instead of the second machine 116a.

Figures 18, 19:
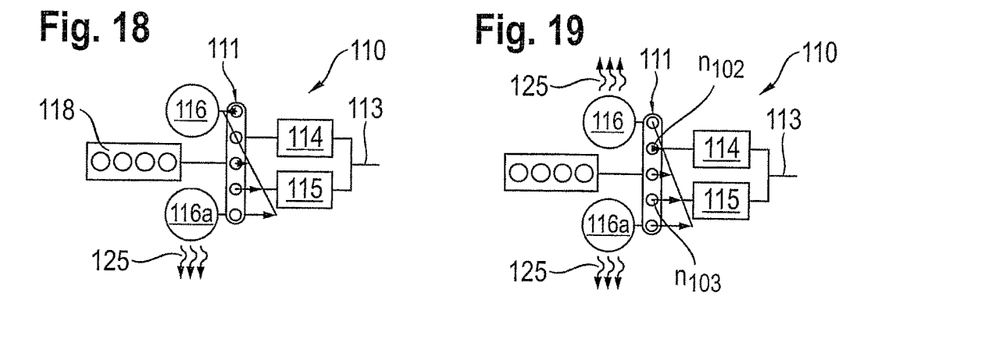
FIG. 18 schematically shows a transmission with a five link power split device in a first operating state.
FIG. 19 schematically shows a transmission with a five link power split device in a second operating state.
Figure 20:
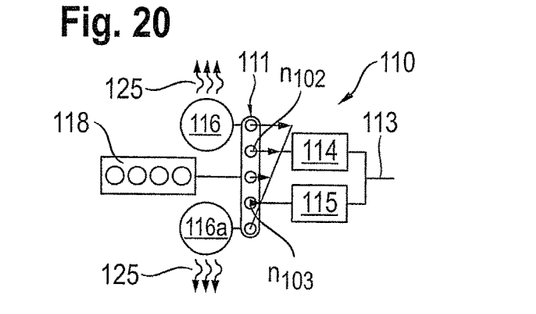
FIG. 20 schematically shows a transmission with a five link power split device in a third operating state.
Figure 21:
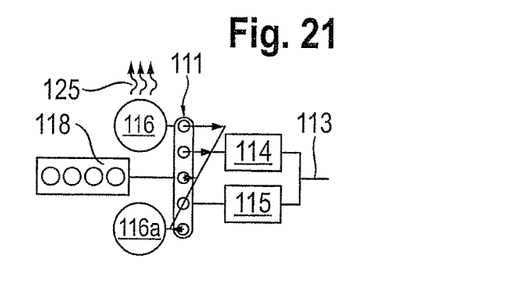
FIG. 21 schematically shows a transmission with a five link power split device in a fourth operating state.

FIG. 18 shows a moving-off situation of the vehicle using the first sub-transmission 114, wherein the prime mover 118 drives the input shaft 112. The first electric machine 116 is wind milling; the second electric machine 116a is rotating with negative torque while braking power 125 of the second electric machine 116a is dissipated. FIG. 19 shows a similar acceleration situation with the fourth link 104 being stopped by the first electric machine 116. The speed $n_{103}$ of the third link 103 is larger than the speed $n_{102}$ of the second link 102. FIG. 20 shows an operating situation with stopped fifth link 105 by the second electric machine 116a, wherein the speed $n_{102}$ of the second link 102 is larger than the speed $n_{103}$ of the third link 103: $n_{102} > n_{103}$. FIG. 21 shows a moving-off situation of the vehicle using the second sub-transmission 115, wherein the second electric machine 116a is wind milling and the first electric machine 116 is rotating with negative torque while braking power 125 of the first electric machine 116 is dissipated.

Figure 22:
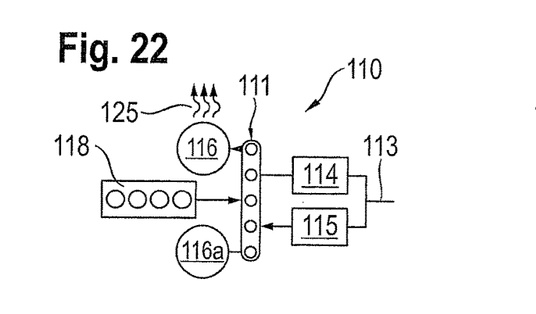
FIG. 22 schematically shows a transmission with a five link power split device in a fifth operating state.
Figure 23:
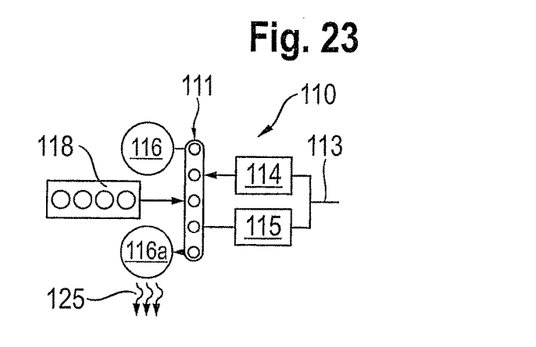
FIG. 23 schematically shows a transmission with a five link power split device in a sixth operating state.
Figure 24:
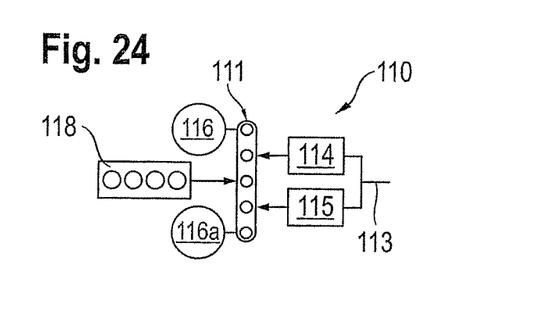
FIG. 24 schematically shows a transmission with a five link power split device in a seventh operating state.

FIG. 22 to 24 show the torque distribution control by the first electric machines 116, 116a. In FIG. 22 controlled by the first electric machine 116 zero torque is applied to the first sub-transmission 114. So shifting is possible in the first sub-transmission 114. In FIG. 23 torque is split between first sub-transmission 114 and second sub-transmission 115. No torque reaction happens at the forth link 104 and the fifth link 105 of the planetary gear set 117. FIG. 24 shows a situation wherein controlled by the second electric machine 116a a zero torque is applied to the second sub-transmission 115. So shifting is possible in the second sub-transmission 115.

Figure 25:
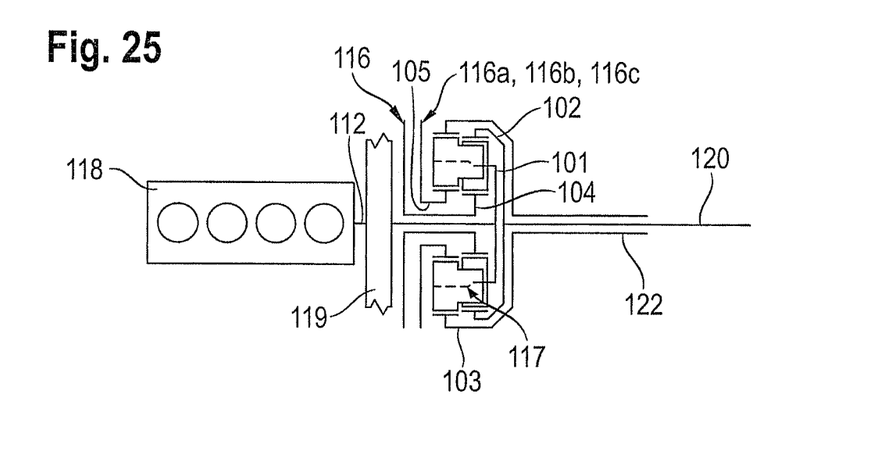
FIG. 25 is a schematic illustration of a multi speed transmission with a five link power split device in accordance with an eight embodiment of the invention.
Figure 26:
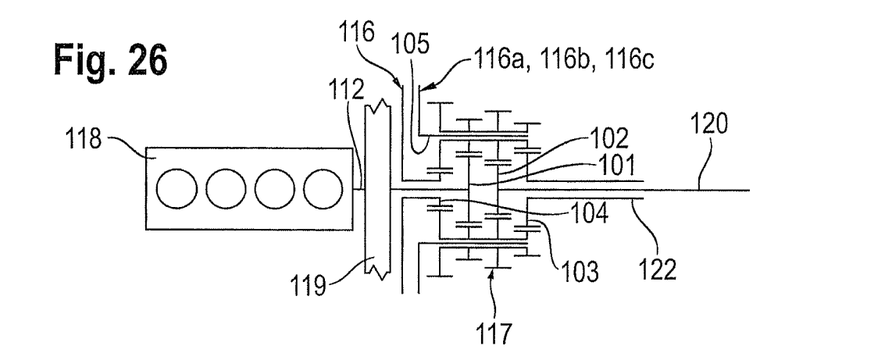
FIG. 26 is a schematic illustration of a multi speed transmission with a five link power split device in accordance with a ninth embodiment of the invention.

FIGS. 25 and 26 show eighth and ninth embodiments of the transmission 110, each having a five link planetary gear set 117 similar to FIG. 14 to 17, wherein the planetary gear set is a modified Ravigneaux gear set, with the first link 101 being a planet carrier, the second link 102 and the third link 103 being ring gears, the forth link 104 and the fifth link 105 being sun gears. The second link 102 and forth link 104 are meshed via a first row of planets, the third link 103 and the fifth link are meshed with a second row of planets, wherein the first and second rows of planets are intermeshed. The input shaft 112 of the transmission 110 is constantly connected to the first link 101 or engageable to the first link 101 of the five-link planetary gear set 117 via a switchable input clutch and/or a dual mass flywheel.

In the eight embodiment shown in FIG. 25 at least one of the planet rows comprises double-mesh planets.

In the ninth embodiment shown in FIG. 26 the five-link gear set 117 comprises the row of planets with quad mesh, wherein the four meshes are meshed with first, second, third and fourth links 102, 102, 103, 104 correspondingly, and the fifth link 105 is connected to the planet carrier. The first, second, third and fourth links 102, 102, 103, 104 may be configures as sun gears or ring gears.

In each embodiment the electric machine(s) 16, 116, 116*a* is (are) controlled by the control system 26, 126, 126*a* in a way that it allows to reduce torque value down to zero on either input shaft 20, 120, of the first sub-transmission 14, 114 or on the input shaft 22, 122 of the second sub-transmission 15, 115 by applying different levels of negative shaft power, while the transmission 10, 110 transfers the power from the input shaft 12, 112 to the output shaft 13, 113.

Figure 27:
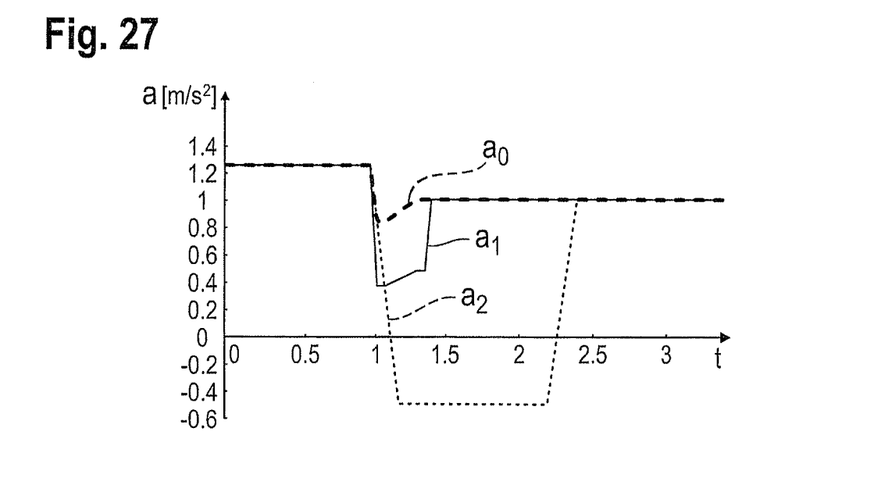
FIG. 27 show acceleration-time sequence plots of a passenger car during gearshifts applying the inventive method.

FIG. 27 shows acceleration-time sequence plots of a passenger car at high speed and wide-open throttle operation of the internal combustion engine, wherein the accelerations $a_1$, $a_2$ of a vehicle applying the inventive device and method is compared to the acceleration $a_3$ of a vehicle with a conventional automated mechanical transmission, during 4 to 5 gear shifting. The line $a_1$ indicates 60% torque fill, the line $a_2$ indicates 100% torque fill during shifting. The plot shows clearly the improvement of the present invention, i.e., a considerable reduction of the torque decrease during gear shifting.

The invention claimed is:

1. A multi-speed transmission comprising:
a power split device;
an input shaft of the transmission is configured and arranged to be connected to a prime mover;
an output shaft;
two shiftable sub-transmissions, each providing a plurality of different gear ratios, and wherein the two sub-transmissions are configured and arranged to be alternatively connected to the output shaft;
at least one rotating electric machine, connected or being connectable to said power split device; and
a control system including a power line, connecting said at least one rotating electric machine with an electric battery and auxiliary electrical consumers; and
wherein the at least one rotating electric machine is connected to the power split device, and the power split device is configured and arranged to reduce torque value down to zero on either an input shaft of the first sub-transmission or on an input shaft of the second sub-transmission by applying different shaft torque levels, and the internal heat generation capacity of the at least one rotating electric machine exceeds the power capacity of the power line.

2. The transmission according to claim 1, wherein the reduced torque value down to zero on the input shaft of either the first sub-transmission or the second sub-transmission results from an equilibrium of torques at least from the electric machine and from the prime mover.

3. The transmission according to claim 1, wherein the connections of the power split device, and the combination of gear ratios of the power split device and the sub-transmissions allow to reduce torque value down to zero on either the input shaft of the first sub-transmission or on the input shaft of the second sub-transmission by applying only negative shaft power to the electric machine while the transmission transfers the power from the input shaft) of the transmission to the output shaft.

4. The transmission according to claim 1, wherein the power split device is a three-link planetary gear set, with a first link, a second link and a third link, wherein the input shaft of the transmission is engaged or engageable to the first link, the input shaft of the first sub-transmission is engaged or engageable to the first link, the input shaft of the second sub-transmission is connected to the third link, and the electric machine is connected to the second link of said three-link planetary gear set, wherein the speed ratio between the second link and the third link is negative for stopped first link.

5. The transmission according to claim 1, wherein the power split device is a three-link planetary gear set, with a first link, a second link and a third link, wherein the input shaft of the transmission is engaged or engageable to the third link, the input shaft of the first sub-transmission is connected to the first link, the input shaft of the second sub-transmission is engageable to the third link, and the electric machine is connected to the second link of said three-link planetary gear set, wherein the speed ratio between the second link and the third link is negative for stopped first link.

6. The transmission according to claim 1, wherein the trans-mission is configured for a vehicle.

7. The transmission according to claim 1, wherein the power split device is a three-link planetary gear set, with a first link, a second link and a third link, wherein the input shaft of the transmission is engageable to the first link via a first input clutch and to the third link via a second input clutch, the input shaft of the first sub-transmission is engageable to the first link via a first intermediate clutch and to the third link via a second intermediate clutch, the input shaft of the second sub-transmission is connected to the input shaft of the transmission, and the electric machine is connected to the second link of said three-link planetary gear set.

8. The transmission according to claim 7, wherein the speed ratio between the second link and the third link is negative for stopped first link.

9. The transmission according to claim 1, wherein the power split device is a five-link planetary gear set, with a first link, a second link, a third link, a fourth link and a fifth link, wherein the input shaft of the transmission is engageable to the first link, the input shaft of the first sub-transmission is connected to the second link, the input shaft of the second sub-transmission is connected to the third link, and a first electric machine of the at least one rotating electric machine is engageable to the fourth link of said five-link planetary gear set.

10. The transmission according to claim 9, comprises a second electric machine, which is connected to the fifth link, and the first electric machine is constantly connected to the forth link.

11. The transmission according to claim 9, wherein it additionally comprises an electric brake, which is connected to the fifth link, and the first electric machine is constantly connected to the forth link.

12. The transmission according to claim 9, wherein it additionally comprises a friction brake, which is connected to the fifth link, and the first electric machine is constantly connected to the fourth link.

13. The transmission according to claim 9, wherein the speed ratio between the second link and the third link is negative for stopped first link, the speed ratio between the forth link and the fifth link is negative for stopped first link, the speed ratio of the forth link to the second link is more than one for stopped first link, and the speed ratio of the fifth link to the third link is more than one for stopped first link.

14. The transmission according to claim 9, wherein the first electric machine is engageable to the fourth link via a first selection clutch and to the fifth link via a second selection clutch, wherein preferably at least one of the first and second selection clutches is configured as a dog clutch.

15. The transmission according to claim 14, wherein at least one of the first and second selection clutches is configured as a dog clutch.

16. The transmission according to claim 9, wherein the five-link planetary gear set is a modified Ravigneaux gear set.

17. The transmission according to claim 16, wherein the five-link planetary gear set comprises the row of planets with quad mesh, said four meshes being meshed with first second third and fourth links correspondingly, and the fifth link being connected to the planet carrier.

18. The transmission according to claim 16, wherein the first link is a planet carrier, the second and the third links are ring gears, the forth and the fifth links are sun gears, the second and forth links are meshed via a first row of planets, the third and fifth links are meshed with a second row of planets and said first and second rows of planets are intermeshed.

19. A method for operating a multi-speed transmission of a vehicle, the method comprising:
  providing the multi-speed transmission including a power split device, an input shaft of the transmission connected to a prime mover, an output shaft, two shiftable sub-transmissions, each of the sub-transmissions providing a plurality of different gear ratios, and at least one rotating electric machine, connected to said power split device;
  alternatively connecting the two sub-transmissions to the output shaft;
  controlling said at least one rotating electric machine with a control system that allows for a reduction in torque down to zero on either an input shaft of the first sub-transmission or an input shaft of the second sub-transmission by applying positive or negative power to the at least one rotating electric machine;
  drawing the positive power from a battery and delivering a fraction of the negative power, which does not exceed instant power consumption from the battery with auxiliary electrical consumers to the battery and to auxiliary electrical consumers; and
  dissipating a residual fraction of the negative power as heat in the electric machine.

20. The method according to claim 19, wherein the wherein the reduced torque value down to zero on the input shaft of either the first sub-transmission or the second sub-transmission results from an equilibrium of torques at least from the electric machine and from the prime mover.

21. The method according to claim 19, wherein the connections of the power split device, and the combination of gear ratios of the power split device and the sub-transmissions allow to reduce torque value down to zero on either the input shaft of the first sub-transmission or on the input shaft of the second sub-transmission by applying only negative shaft power to the electric machine while the transmission transfers the power from the input shaft to the output shaft.

22. The method according to claim 19, wherein the electric machine is used in at least one operation range of the vehicle as launch brake device, shift torque-filling brake device, transmission retarder brake device, shaft speed synchronizer, engine starter or alternator.

23. A multi-speed transmission comprising:
  a power split device having at least three links;
  an input shaft of the transmission is configured and arranged to be connected to a prime mover;
  an output shaft;
  two shiftable sub-transmissions, each providing a plurality of different gear ratios, and wherein the two sub-transmissions can be connected alternatively to the output shaft;
  at least one rotating electric machine, connected to said power split device; and
  a control system including a power line, connecting said at least one rotating electric machine with an electric battery and auxiliary electrical consumers; and
  wherein the at least one rotating electric machine is configured and arranged to connect to one of the links of the power split device, and the input shaft of the transmission and the input shafts of the sub-transmissions are configured and arranged to be connected to the other links of the power split device, and wherein the internal heat generation capacity of the at least one rotating electric machine exceeds the power capacity of the power line.

24. The transmission according to claim 23, wherein the connections of the power split device, and the combination of gear ratios of the power split device and the sub-transmissions allow to reduce torque value down to zero on either the input shaft of the first sub-transmission or on the input shaft of the second sub-transmission by applying only negative shaft power to the electric machine while the transmission transfers the power from the input shaft of the transmission to the output shaft.

25. The transmission according to claim 23, wherein the power split device is a three-link planetary gear set, with a first link, a second link and a third link, wherein the input shaft of the transmission is engaged or engageable to the first link, the input shaft of the first sub-transmission is engaged or engageable to the first link, the input shaft of the second sub-transmission is connected to the third link, and the electric machine is connected to the second link of said three-link planetary gear set, wherein the speed ratio between the second link and the third link is negative for stopped first link.

26. The transmission according to claim 23, wherein the power split device is a three-link planetary gear set, with a first link, a second link and a third link, wherein the input shaft of the transmission is engaged or engageable to the third link, the input shaft of the first sub-transmission is connected to the first link, the input shaft of the second sub-transmission is engageable to the third link, and the electric machine is connected to the second link of said three-link planetary gear set, wherein the speed ratio between the second link and the third link is negative for stopped first link.

27. The transmission according to claim 23, wherein the transmission is configured for a vehicle.

28. The transmission according to claim 23, wherein the power split device is a three-link planetary gear set, with a first link, a second link and a third link, wherein the input shaft of the transmission is engageable to the first link via a first input clutch and to the third link via a second input clutch, the input shaft of the first sub-transmission is engageable to the first link via a first intermediate clutch and to the third link via a second intermediate clutch, the input shaft of the second sub-transmission is connected to the input shaft of the transmission, and the electric machine is connected to the second link of said three-link planetary gear set.

29. The transmission according to claim 28, wherein the speed ratio between the second link and the third link is negative for stopped first link.

30. The transmission according to claim 23, wherein the power split device is a five-link planetary gear set, with a first link, a second link, a third link, a fourth link and a fifth link, wherein the input shaft of the transmission is engageable to the first link, the input shaft of the first sub-transmission is connected to the second link, the input shaft of the second sub-transmission is connected to the third link, and a first electric machine of the at least one rotating electric machine is engageable to the fourth link of said five-link planetary gear set.

31. The transmission according to claim 30, wherein it additionally comprises a second electric machine, which is connected to the fifth link, and the first electric machine is constantly connected to the forth link.

32. The transmission according to claim 30, wherein it additionally comprises an electric brake, which is connected to the fifth link, and the first electric machine is constantly connected to the forth link.

33. The transmission according to claim 32, wherein the electric brake is embodied as an eddy current brake.

34. The transmission according to claim 30, wherein it additionally comprises a friction brake, which is connected to the fifth link, and the first electric machine is constantly connected to the fourth link.

35. The transmission according to claim 30, wherein the first electric machine is engageable to the fourth link via a first selection clutch and to the fifth link via a second selection clutch.

36. The transmission according to claim 35, wherein at least one of the first and second selection clutches is configured as a dog clutch.

37. The transmission according to claim 30, wherein the five-link planetary gear set is a modified Ravigneaux gear set.

38. The transmission according to claim 37, wherein the five-link planetary gear set comprises the row of planets with quad mesh, said four meshes being meshed with first second third and fourth links correspondingly, and the fifth link being connected to the planet carrier.

39. The transmission according to claim 37, wherein the first link is a planet carrier, the second and the third links are ring gears, the forth and the fifth links are sun gears, the second and forth links are meshed via a first row of planets, the third and fifth links are meshed with a second row of planets and said first and second rows of planets are intermeshed.

40. The transmission according to claim 30, wherein the speed ratio between the second link and the third link is negative for stopped first link, the speed ratio between the forth link and the fifth link is negative for stopped first link, the speed ratio of the forth link to the second link is more than one for stopped first link, and the speed ratio of the fifth link to the third link is more than one for stopped first link.

* * * * *